(12) United States Patent
Fluman et al.

(10) Patent No.: US 9,417,813 B2
(45) Date of Patent: Aug. 16, 2016

(54) TUNING OVERPROVISIONING BASED ON THE USED BLOCK COUNT

(71) Applicant: International Business Machines Corporation, Armonk, NY (US)

(72) Inventors: Mudi M. Fluman, Haifa (IL); Yaacov Frank, Ramot Meir (IL); Yehuda Shiran, Haifa (IL); Ronny Vatelmacher, Tel Aviv (IL)

(73) Assignee: International Business Machines Corporation, Armonk, NY (US)

( * ) Notice: Subject to any disclaimer, the term of this patent is extended or adjusted under 35 U.S.C. 154(b) by 63 days.

(21) Appl. No.: 14/474,757

(22) Filed: Sep. 2, 2014

(65) Prior Publication Data

US 2016/0062702 A1 Mar. 3, 2016

(51) Int. Cl.
*G06F 3/06* (2006.01)
(52) U.S. Cl.
CPC ............ *G06F 3/0653* (2013.01); *G06F 3/0604* (2013.01); *G06F 3/0631* (2013.01); *G06F 3/0679* (2013.01)
(58) Field of Classification Search
None
See application file for complete search history.

(56) References Cited

U.S. PATENT DOCUMENTS

| 8,479,080 | B1 | 7/2013 | Shalvi et al. |
| 8,489,855 | B2 | 7/2013 | Schuette |
| 2011/0264843 | A1 | 10/2011 | Haines et al. |
| 2013/0061019 | A1 | 3/2013 | Fitzpatrick et al. |
| 2013/0067138 | A1 | 3/2013 | Schuette et al. |
| 2014/0089565 | A1* | 3/2014 | Lee .......................... G06F 3/061 711/103 |
| 2014/0101379 | A1* | 4/2014 | Tomlin .................. G06F 3/0608 711/103 |

FOREIGN PATENT DOCUMENTS

WO 2012148828 A3 11/2012

OTHER PUBLICATIONS

Sun et al., "SCM Capacity and NAND Over-Provisioning Requirements for SCM/NAND Flash Hybrid Enterprise SSD", 2013 5th IEEE International Memory Workshop (IMW), May 26-29, 2013, Monterey, CA, pp. 64-67, 978-1-4673-6168-2, DOI: 10.1109/IMW.2013.6582099.

* cited by examiner

*Primary Examiner* — Gary Portka
(74) *Attorney, Agent, or Firm* — William H. Hartwell

(57) ABSTRACT

Software that performs the following steps: (i) collecting a set of sampling value(s), where each sampling value of the set of sampling value(s) respectively corresponds to an amount of overprovisioning-related data stored in a non-volatile memory device (NVMD) at the time the corresponding sampling value is collected; and (ii) determining an overprovisioning ratio for use with the NVMD based, at least in part, on the set of sampling value(s). The overprovisioning-related data is any data stored in overprovisioning space as a result of overprovisioning-type operations.

20 Claims, 2 Drawing Sheets

TUNING OVERPROVISIONING BASED ON THE USED BLOCK COUNT

BACKGROUND OF THE INVENTION

The present invention relates generally to the field of control of overprovisioning of non-volatile memory devices.

Overprovisioning (OP) is known. Overprovisioning is the difference between: (i) the physical capacity of a non-volatile memory device (for example, a flash drive); and (ii) the logical capacity presented through the operating system (OS) as available for the user. Overprovisioning-type operations (for example, garbage collection, wear-leveling, and bad block mapping operations on an SSD (solid state drive)) lead to data being stored in overprovisioning space (see definition, below, in the Definitions sub-section). The allocated space for overprovisioning lowers the write amplification when a controller writes to the flash memory. Overprovisioning reduces user capacity, but it gives back reduced write amplification, increased endurance, and increased performance.

For purposes of the present document, two categories of non-volatile memory/storage devices will be defined: (i) non-volatile storage devices (NVSD); and (ii) non-volatile memory devices (NVMD). An NVSD is any non-volatile memory/storage device that does not use over-provisioning. An NVMD is any non-volatile memory/storage device that uses over-provisioning. Some conventional NVMDs are solid state, but this is not necessarily required. One currently conventional type of device that is typically used as an NVMD is a solid state flash drive. It should be noted that there may be physical devices (now known or to be developed in the future) which can function either as an NVSD or an NVMD. Typically, overprovisioning is used for memory/storage devices that: (i) only allow block-by-block deletion; and (ii) have a relatively limited lifespan in terms of write/delete cycles. NVMD typically cannot simply write data to a specific logical block address (LBA), but, rather, typically manage the writing with a relatively sophisticated algorithm.

SUMMARY

According to an aspect of the present invention, there is a method, computer program product and/or system that performs the following steps (not necessarily in the following order): (i) collecting a set of sampling value(s), where each sampling value of the set of sampling value(s) respectively corresponds to an amount of overprovisioning-related data stored in a non-volatile memory device (NVMD) at the time the corresponding sampling value is collected; and (ii) determining an overprovisioning ratio for use with the NVMD based, at least in part, on the set of sampling value(s). The overprovisioning-related data is any data stored in overprovisioning space as a result of overprovisioning-type operations.

DETAILED DESCRIPTION

Figure 1:
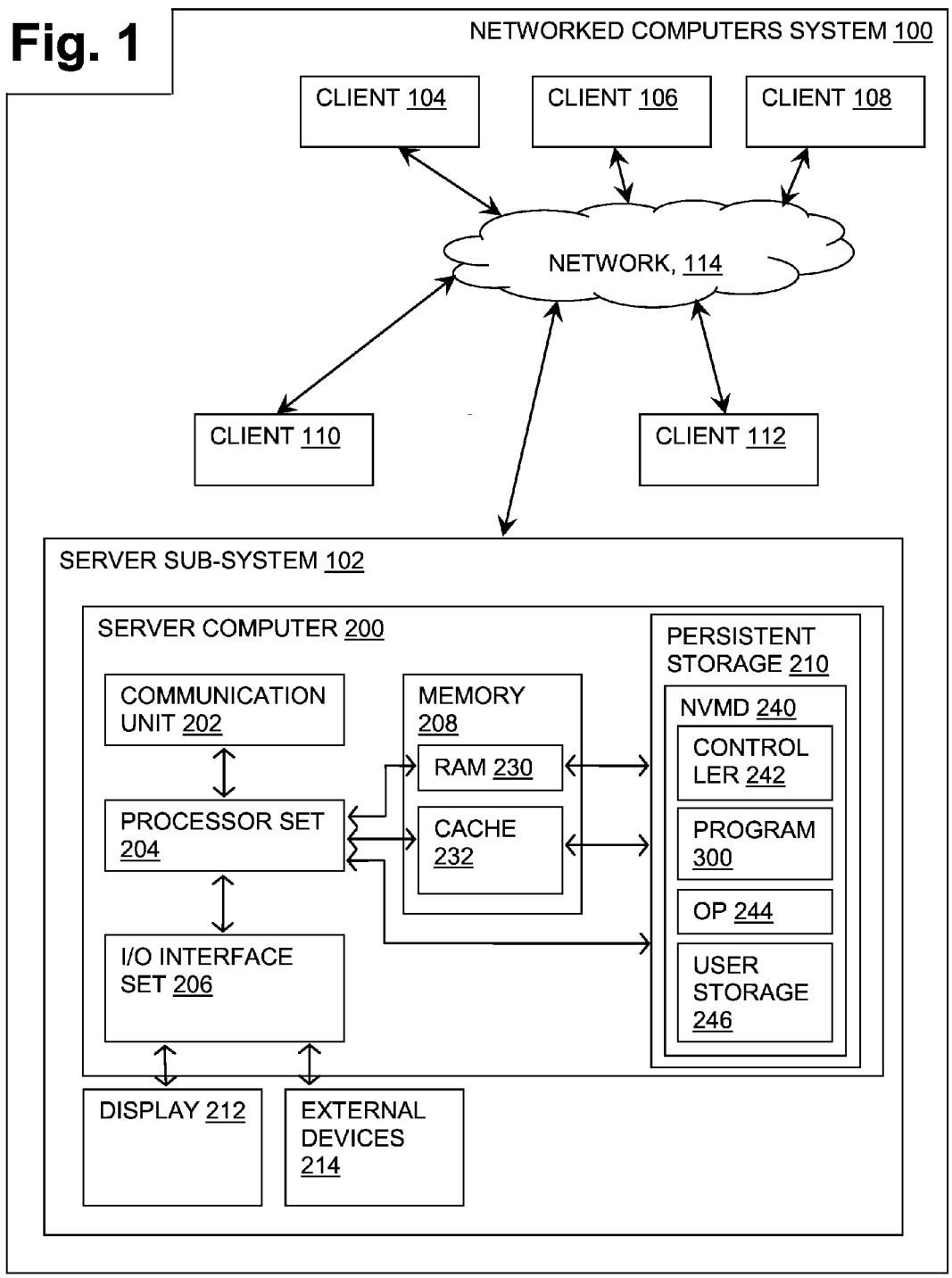
FIG. 1 is a block diagram view of a first embodiment of a system according to the present invention.

This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: server sub-system 102; client sub-systems 104, 106, 108, 110, 112; communication network 114; server computer 200; communication unit 202; processor set 204; input/output (I/O) interface set 206; memory device 208; persistent storage device 210; display device 212; external device set 214; random access memory (RAM) devices 230; cache memory device 232; non-volatile memory device 240; controller 242; overprovisioning portion 244; user storage portion 246; and program 300.

Sub-system 102 is, in many respects, representative of the various computer sub-system(s) in the present invention. Accordingly, several portions of sub-system 102 will now be discussed in the following paragraphs.

Sub-system 102 may be a computer server, laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems. Server sub-systems may be connected to each other via LAN, WAN, fiber optics, or any other media such as network switches and wires.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Program 300 may also be accessed and/or executed by a controller 242 located within the persistent storage 210. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes the non-volatile memory device (NVMD) 240, which includes a solid state hard drive. To name some possible variations, persistent storage 210 may include a magnetic hard disk drive, a semiconductor storage device, read-only memory (ROM), erasable programmable read-only memory (EPROM), flash memory, or any other computer-readable storage media that is capable of storing program instructions or digital information. The NVMD 240 includes the controller 242, the overprovisioning portion 244, and the user storage portion 246.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

II. Example Embodiment

Figure 2:
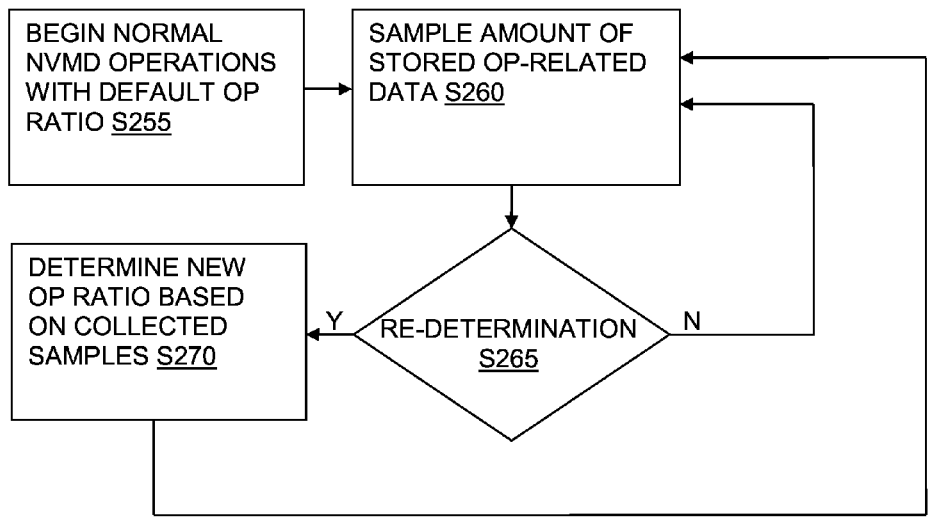
FIG. 2 is a flowchart showing a first embodiment method performed, at least in part, by the first embodiment system.
Figure 3:
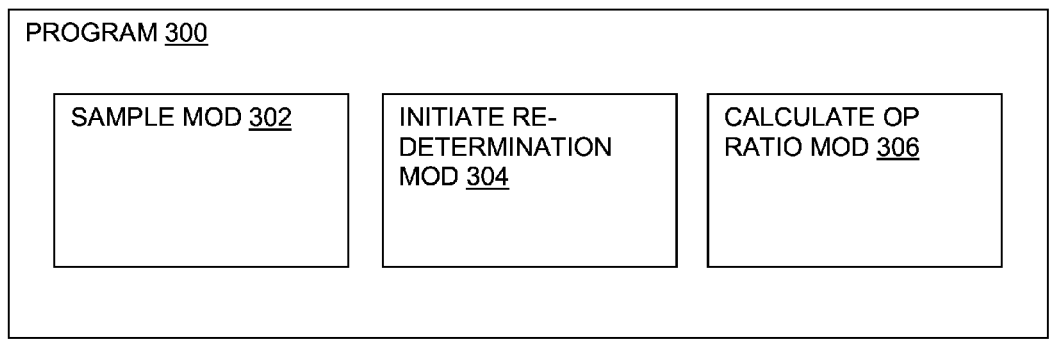
FIG. 3 is a block diagram view of a machine logic (for example, software) portion of the first embodiment system.

FIG. 2 shows flowchart 250 depicting a method according to the present invention. FIG. 3 shows program 300 for performing at least some of the method steps of flowchart 250. The program 300 is located on the NVMD 240 and is executed by the controller 242 (see FIG. 1), where the controller is adapted to execute the program 300 and perform other OP-related operations. For sake of scope coverage and ease of understanding, in this embodiment, controller 242 runs the program 300 and the program 300 located on the NVMD 240, but this is not necessarily preferred. In other embodiments, the program: (i) is not stored on the SSD, but, rather, on external device 214 and/or memory 208; and (ii) is not executed by the controller 242, but, rather, by the processor set 204. In these embodiments, the processor set 204 will communicate with the controller 242 and get the sampled data it needs about the overprovisioning (OP) status. This method and associated software will now be discussed, over the course of the following paragraphs, with extensive reference to FIG. 2 (for the method step blocks) and FIG. 3 (for the software blocks).

Processing begins at step S255, where normal NVMD 240 operations begin with a default OP ratio set by the NVMD 240 manufacturer. The OP ratio represents the amount of the NVMD's 240 overall storage space that is occupied by the OP portion 244 (see FIG. 1) and is therefore unavailable to a user. In the present embodiment, the NVMD 240 has 1,000 Megabytes (MB) of storage space. The default OP ratio is set to 40%, which means that the OP portion 244 of the NVMD 240 contains 400 MB of storage space. This leaves 60% (or 600 MB) of the NVMD's 240 storage space for the user storage portion 246. Both the OP portion 244 and the user storage portion 246 are logically mapped to physical addresses on the NVMD 240, and as such the OP portion 244 and the user storage portion 246 are not constrained or limited to specific physical locations. Alternatively, in other embodiments, the OP portion 244 and/or the user storage portion 246 may, in fact, occupy specific physical addresses such that the OP portion 244 and the user storage portion 246 are physically separated on the NVMD 240.

Processing proceeds to step S260, where a sample module (or "mod") 302 (see FIG. 3) determines how much OP-related data is stored in the OP portion 244 of the NVMD 240 (see FIG. 1). The amount of stored OP-related data is then recorded and saved for future steps. To be clear, the amount of stored OP-related data will typically differ from the amount of OP-related data available in the OP portion 244. In many situations, the controller 242 will only require a subportion of the OP portion 244 to complete its OP operations. In the present embodiment, for example, only thirty percent (or 120 MB) of the available data in the OP portion 244 is stored at the time of the sample. This means that, at the time of the sample, seventy percent (or 280 MB) of the available data in the OP portion 244 of the NVMD 240 is left unused by the controller's 242 OP operations. This unused storage space may become available to be converted to the user storage portion 246 in subsequent steps.

The sample mod 302 (see FIG. 3) further determines when to perform the sampling step S260 (see FIG. 2). In the present embodiment, sample mod 302 performs the sampling step S260 at the beginning of each hour, with hours being measured by a system clock controlled by processor set 204 (see FIG. 1). Alternatively, sample mod 302 could determine the timing of the sampling step S260 in any number of ways. For example, sampling step S260 could begin at a random time calculated by a random number generator. Or, alternatively, sampling step S260 could be triggered when the controller 242 or the processor set 204 (see FIG. 1) takes a specific action, such as a drive write, garbage collection, or a wear-leveling action. In yet another example, sampling step S260 could be triggered manually by the user.

Upon completion of the sampling step S260, processing then proceeds to step S265, where an initiate re-determination mod 304 (see FIG. 3) evaluates one or more redetermination criteria to determine (or decide) whether more samples need to be taken. If, when applied, the redetermination criteria determine that more samples need to be taken, then processing returns back to step S260 to take another sample and continue normal operations. If the redetermination criteria determine that conditions are ripe for a redetermination of the OP ratio, however, then processing proceeds to step S270. In the present embodiment, there is only one redetermination criterion: check whether the quantity of completed samples is one hundred (100). Because, in the present case, only one sample has been taken, the criterion resolves to false, and processing returns back to step S260.

The redetermination criteria may include any of a wide range of available factors. In one example, the redetermination criteria include a measurement of the variation (such as a standard deviation or some other metric) between the samples taken during the sample step S260. If, for example, after fifty samples, the variation between the samples falls below a predetermined randomness threshold, the re-determination mod 304 may determine that no additional samples need to be taken. In another example, the redetermination criteria include looking at factors such as the total number of drive writes and the amount of data stored in the user storage portion 246 of the NVMD 240 (see FIG. 1). In still yet another example, the redetermination criteria are based, at least in part, on the projected lifespan of the NVMD 240, ensuring that the new OP ratio is determined and set with enough time left in the NVMD's 240 projected lifespan to allow the user to realize the benefits of the new OP ratio.

Once the redetermination criteria have been met, processing proceeds to step S270, where the calculate OP ratio mod 306 (see FIG. 3) determines a new OP ratio based on the collected samples. In the present embodiment, the calculation includes taking the maximum of the collected samples and adding an additional five percent (5%) as a buffer. The resulting percentage is then applied to the existing OP ratio. In this specific example, the maximum sample value is eighty percent (80%). Therefore, the new OP ratio equals eighty four (84%) of the original OP ratio (as 80% plus an additional 5% of 80% equals 84%). Taking 84% of the original OP ratio of 40%, the mod 306 calculates a new OP ratio of thirty three and six tenths percent (33.6%).

The calculate OP ratio mod 306 may calculate the new OP ratio in any number of ways, and may be based, at least in part, on the intended uses for the NVMD 240 and/or on user preference. In some embodiments, where maximizing storage space is preferred, the calculation may rely primarily on the average sample value. Alternatively, in other embodiments, where maximizing performance is preferred, the calculation may rely primarily on the maximum sample value. The new OP ratio may also combine sampled values with an uncertainty factor adapted to account for randomness in workloads and/or the wear level on the NVMD 240.

Once the new OP ratio has been calculated, the calculate OP ratio mod 306 sets the NVMD's 240 new OP ratio, adjusting the size of the OP portion 244 and the user storage portion 246 (see FIG. 1) accordingly. In the present embodiment, where the new OP ratio equals 33.6% of the NVMD's 240 1,000 MB capacity, the capacity of the OP portion 244 is decreased to 336 MB, and the user storage portion 246 is correspondingly increased to absorb the newly available space, for a new capacity of 664 MB.

Upon completion of step S270, the NVMD 240 will continue its normal operation for the duration of its life cycle. It is anticipated, however, that future sample steps S260 (as shown in FIG. 2) may be beneficial to further optimize the size of the OP portion 244 on the NVMD 240. In various embodiments of the present invention, sampling may be: (i) confined to a single "learning period"; (ii) performed during multiple, discrete learning periods; or (iii) performed at all times such that there are no "learning periods." Using the present example, if the controller 242 detects, over a period of time, repeated instances of write throttling due to the 336 MB OP portion 244 being at full capacity, the controller 242 will initiate a new step S260 to begin reassessing the size of the OP portion 244. Or, alternatively, a new step S260 may be initiated if the computer 200 is repurposed for a new use and/or a new user, where it is known that there will be a significant change in the NVMD's 240 workload. In either event, additional sample steps S260 may help to further optimize the size of the OP portion 244 on the NVMD 240.

III. Further Comments and/or Embodiments

Some embodiments of the present invention may include one, or more, of the following features, characteristics and/or advantages: (i) tuning the space needed for overprovisioning (OP), based, at least in part, on feedback from an actual number of used blocks from an allocated OP pool; (ii) foregoing an assessment of the randomness of the workload; (iii) tuning an "OP percentage" just once (as opposed to continuous or dynamic tuning); (iv) tuning the OP percentage after a learning period; (v) initially, before the learning period, using a default OP provided by a non-volatile memory device (NVMD) manufacturer (which is typically relatively high to support a variety of workloads); (vi) setting a learning period to be sufficiently long to capture the characteristics of the workload; (vii) setting a learning period to be sufficiently short to allow benefits of the tuning for an NVMD's life expectancy; and/or (viii) tuning in a manner that lowers the OP percentage, freeing more space for the user.

Conventionally, OP management typically does not occur across multiple NVMDs. However, to the extent that OP management is, or in the future comes to be, applied across multiple NVMDs, embodiments of the present invention may account for that.

In many embodiments of the present invention, an NVMD controller uses the allocated OP space to move data and thereby optimize NVMD performance. However, if the amount of OP needed by the controller exceeds the allocated OP, a driver will throttle any incoming write requests and will thereby negatively impact performance. As such, it is desired that a new OP percentage (N) be sufficiently high to meet the typical requirements of the controller. At the same time, N should be sufficiently small so as to maximize the available NVMD space for the user. To accomplish these goals, in some embodiments, the controller uses a software tuning algorithm to monitor the number of OP blocks that are actually used. For example, in one embodiment, the NVMD includes 1,000 Gigabytes (GB) of memory with 20% OP. This means that the usable space for the user is only 800 GB, because the controller reserves 200 GB for use by its own tuning algorithm. Additionally, if the controller is actually using only 100 GB of the 200 GB of reserved OP blocks, potentially 100 GB can be returned to the usable space for the user, thereby reducing OP to 10% as opposed to the starting 20% OP. In many embodiments, less than all of the unused OP blocks are returned to the usable space. In one example embodiment, 20% (or some other configurable portion of the unused OP blocks) should be returned. Typically, the initial, default OP percentage will be higher than the final OP after tuning. This provides the benefit of allowing NVMD manufacturers to be more relaxed in picking the initial OP configuration, as they can count on the tuning to reduce the OP. However, to the extent that tuning can now, or in the future, be used to increase the amount of OP, embodiments of the present invention may account for that.

In various embodiments of the present invention, the tuning algorithm may be one of a variety of algorithm types. One tuning algorithm according to the present invention is as follows: (i) install the NVMD with the vendor's default OP percentage; (ii) start a learning period; (iii) sample the used OP block count during the learning period; (iv) end the learning period; (v) compute the mean (M) and standard deviation (SDV) of all measurements taken over the learning period; (vi) determine the new desired OP percentage (N), based, at least in part, on the computed values for M and SDV; and/or (vii) set the new OP to N. It is contemplated that this tuning algorithm may be used on its own or in combination with other tuning methods. For example, the tuning algorithm may be combined with algorithms that adjust OP based on wear leveling and/or an assessment of the randomness of the workload on the NVMD.

In one embodiment of the present invention, the learning period is measured by three milestones: (a) a minimum number of days (MinD); (b) a maximum number of days (MaxD); and (c) a minimum number of drive writes (DW). A DW occurs when all physical blocks on the NVMD are written once, regardless of whether they are assigned as user data or OP blocks. To explain more fully, in this embodiment, the learning period will last at least MinD days and then continue until MaxD days or DW, whichever comes first. For example, DW may equal 10, meaning the NVMD will be written at least ten (10) times during the learning period. If the workload is busy, 10 DW may be reached prior to reaching MinD, in which case the learning period will end at MinD. Conversely, if the workload is not busy, 10 DW may not be reached prior to reaching MaxD, in which case the learning period will end at MaxD. In this embodiment: (a) MinD is designed to be sufficiently long to capture the memory needs of the workload over time; and (b) MaxD is designed to be sufficiently short to allow for tuning to complete with enough time remaining in the NVMD's life expectancy to realize the benefits of the tuning. Stated another way, with respect to item (b), the learning period should not be so long that it takes up most of the expected life of the NVMD.

In some embodiments, during the learning period, unused OP capacity is measured (or "sampled") at sampling times and/or events. For example, in some embodiments of the present invention, samples may be taken every time the NVMD is fully written. This event-based sampling may be particularly useful in embodiments where a complete drive write takes place frequently, such as every 30 minutes. In these embodiments, the workload is sufficiently intensive such that sampling at every drive write is ideal. However, if the workload is less intensive (e.g. one drive write takes more than 30 minutes), samples may be taken at time intervals, such as once every hour. In any event, every time a sample is taken, the used OP block count may be recorded and a value U computed, where U equals the percentage of the reserved OP blocks that are actually in use at the time of the sample. For example, if the reserved OP block count is 30% of the NVMD's storage capacity, but the used OP block count is only 10% of the NVMD's storage capacity, U equals 33.3%, as only 33.3% of the allocated OP blocks are actually being used.

Once sampling has occurred, the new desired OP percentage (N) may be calculated by one or more of a variety of methods. In one embodiment, N may equal the mean (M) plus X standard deviations (SDV) of all measurements (U) taken over the learning period (represented by the equation $N = M + X*SDV$). In this embodiment, increasing the value of X (and thereby increasing the value of N) will increase the probability that the new OP (N) will meet the OP requirements of the controller. In one embodiment of the present invention, X equals 3. In this embodiment, the amount of OP requested by the controller will rarely exceed the allocated OP (in approximately only 0.3% of cases).

Upon calculating N, the controller will set the new OP of the NVMD to N. However, in some embodiments of the present invention, the controller will continue to monitor the used OP after this initial tuning. This monitoring may occur at additional sampling times and/or events through the life of the NVMD. If, for example, workloads become less random, the OP percentage may be decreased. Alternatively, if workloads on the NVMD become more random over time, the OP percentage may be increased. In one embodiment, a message may be sent to the user indicating a recommended OP increase, allowing the user to choose whether to accept the change or leave the OP as-is. In this embodiment, the user may be provided an opportunity to copy data off of the NVMD if needed to increase the OP percentage manually.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

Overprovisioning space: space in a non-volatile memory device that is allocated for overprovisioning-type operations (now known or to be developed in the future), such as garbage collection, wear-leveling, bad block mapping, etc.

What is claimed is:

1. A method comprising:
   determining a first amount of overprovisioning-related data stored in a non-volatile memory device (NVMD) at a first time;
   determining a second amount of overprovisioning-related data stored in the NVMD at a second time; and
   determining an overprovisioning ratio for use with the NVMD based, at least in part, on the first amount of overprovisioning-related data and the second amount of overprovisioning-related data;

wherein the overprovisioning-related data is data stored in overprovisioning space as a result of overprovisioning-type operations.

2. The method of claim 1, further comprising:
operating the NVMD under the overprovisioning ratio so that overprovisioning-type operations store and delete data in the overprovisioning space.

3. The method of claim 2, further comprising:
assessing, upon operating the NVMD under the overprovisioning ratio, a condition of the NVMD; and
deciding, based, at least in part, on the assessed condition of the NVMD, whether to determine a third amount of overprovisioning-related data stored in the NVMD at a third time.

4. The method of claim 3, further comprising:
upon deciding to determine a third amount of overprovisioning-related data stored in the NVMD at a third time, determining the third amount of overprovisioning-related data stored in the NVMD at the third time; and
redetermining the overprovisioning ratio based, at least in part, on the third amount of overprovisioning-related data.

5. The method of claim 1, wherein:
the determinations of the first amount of overprovisioning-related data and the second amount of overprovisioning-related data are made according to one or more sampling criteria.

6. The method of claim 1, wherein:
a quantity of additional determinations of amounts of overprovisioning-related data are determined by one or more redetermination criteria.

7. The method of claim 1, further comprising:
beginning, prior to determining the overprovisioning ratio, with an initial overprovisioning ratio.

8. A computer program product comprising a computer readable storage medium having stored thereon:
program instructions programmed to determine a first amount of overprovisioning-related data stored in a non-volatile memory device (NVMD) at a first time;
program instructions programmed to determine a second amount of overprovisioning-related data stored in the NVMD at a second time; and
program instructions programmed to determine an overprovisioning ratio for use with the NVMD based, at least in part, on the first amount of overprovisioning-related data and the second amount of overprovisioning-related data;
wherein the overprovisioning-related data is data stored in overprovisioning space as a result of overprovisioning-type operations.

9. The computer program product of claim 8, further comprising:
program instructions programmed to operate the NVMD under the overprovisioning ratio so that overprovisioning-type operations store and delete data in the overprovisioning space.

10. The computer program product of claim 9, further comprising:
program instructions programmed to assess, upon operating the NVMD under the overprovisioning ratio, a condition of the NVMD; and
program instructions programmed to decide, based, at least in part, on the assessed condition of the NVMD, whether to determine a third amount of overprovisioning-related data stored in the NVMD at a third time.

11. The computer program product of claim 10, further comprising:
program instructions programmed to, upon deciding to determine a third amount of overprovisioning-related data stored in the NVMD at a third time, determine the third amount of overprovisioning-related data stored in the NVMD at the third time; and
program instructions programmed to redetermine the overprovisioning ratio based, at least in part, on the third amount of overprovisioning-related data.

12. The computer program product of claim 8, wherein:
the determinations of the first amount of overprovisioning-related data and the second amount of overprovisioning-related data are made according to one or more sampling criteria.

13. The computer program product of claim 8, wherein:
a quantity of additional determinations of amounts of overprovisioning-related data are determined by one or more redetermination criteria.

14. The computer program product of claim 8, further comprising:
program instructions programmed to begin, prior to determining the overprovisioning ratio, with an initial overprovisioning ratio.

15. A computer system comprising:
a processor(s) set; and
a computer readable storage medium;
wherein:
the processor set is structured, located, connected and/or programmed to run program instructions stored on the computer readable storage medium; and
the program instructions include:
program instructions programmed to determine a first amount of overprovisioning-related data stored in a non-volatile memory device (NVMD) at a first time;
program instructions programmed to determine a second amount of overprovisioning-related data stored in the NVMD at a second time; and
program instructions programmed to determine an overprovisioning ratio for use with the NVMD based, at least in part, on the first amount of overprovisioning-related data and the second amount of overprovisioning-related data;
wherein the overprovisioning-related data is data stored in overprovisioning space as a result of overprovisioning-type operations.

16. The computer system of claim 15, further comprising:
program instructions programmed to operate the NVMD under the overprovisioning ratio so that overprovisioning-type operations store and delete data in the overprovisioning space.

17. The computer system of claim 16, further comprising:
program instructions programmed to assess, upon operating the NVMD under the overprovisioning ratio, a condition of the NVMD; and
program instructions programmed to decide, based, at least in part, on the assessed condition of the NVMD, whether to determine a third amount of overprovisioning-related data stored in the NVMD at a third time.

18. The computer system of claim 17, further comprising:
program instructions programmed to, upon deciding to determine a third amount of overprovisioning-related data stored in the NVMD at a third time, determine the third amount of overprovisioning-related data stored in the NVMD at the third time; and program instructions programmed to redetermine the overprovisioning ratio based, at least in part, on the third amount of overprovisioning-related data.

19. The computer system of claim 15, wherein:
the determinations of the first amount of overprovisioning-related data and the second amount of overprovisioning-related data are made according to one or more sampling criteria.

20. The computer system of claim 15, wherein:
a quantity of additional determinations of amounts of overprovisioning-related data are determined by one or more redetermination criteria.

* * * * *